(12) United States Patent
Richet et al.

(10) Patent No.: US 6,502,349 B1
(45) Date of Patent: Jan. 7, 2003

(54) LAWN AND GARDEN EDGING DEVICE

(76) Inventors: Clarke Richet, 791 Twan Place, Quesnel, British Columbia (CA), V2J 7H4; Catharine Richet, 791 Twan Place, Quesnel, British Columbia (CA), V2J 7H4

( * ) Notice: Subject to any disclaimer, the term of this patent is extended or adjusted under 35 U.S.C. 154(b) by 0 days.

(21) Appl. No.: 09/867,686

(22) Filed: May 30, 2001

(51) Int. Cl.$^7$ .................................................. A01G 1/08
(52) U.S. Cl. ........................................................ 47/33
(58) Field of Search ............................. 47/33; 52/102; 404/7, 8

(56) References Cited

U.S. PATENT DOCUMENTS

| | | | | |
|---|---|---|---|---|
| 2,842,344 A | * | 7/1958 | Todd ........................... 256/21 |
| 3,314,193 A | * | 4/1967 | Chancellor ..................... 47/33 |
| 3,373,668 A | * | 3/1968 | Moore et al. .................. 404/41 |
| 3,957,383 A | * | 5/1976 | Fredericks ..................... 404/8 |
| 4,349,596 A | | 9/1982 | Hendrix |
| 4,372,079 A | | 2/1983 | Trageser |
| 4,809,459 A | | 3/1989 | Brylla et al. |
| 4,969,289 A | | 11/1990 | Trifiletti |
| 5,048,241 A | * | 9/1991 | Gavin, Jr. ..................... 52/102 |
| 5,080,523 A | * | 1/1992 | Steiner ......................... 404/7 |
| 5,119,587 A | * | 6/1992 | Waltz ............................ 47/33 |
| D336,220 S | | 6/1993 | Grimes |
| 5,259,154 A | * | 11/1993 | Lilley ............................ 47/33 |
| 5,544,445 A | | 8/1996 | Mantilla |
| 5,857,288 A | * | 1/1999 | Wiste ............................ 47/33 |
| 5,921,021 A | | 7/1999 | Coates |
| 6,038,811 A | | 3/2000 | Conway |
| 6,327,815 B1 | * | 12/2001 | Becton et al. ................. 47/33 |

* cited by examiner

*Primary Examiner*—Peter M. Poon
*Assistant Examiner*—Son T. Nguyen
(74) *Attorney, Agent, or Firm*—Michael I Kroll

(57) ABSTRACT

A lawn and garden edging device is provided for serial coupling to form both linear and angled segments for defining lawn and garden boundaries and isolating building structures from the same. A center base portion has reduced thickness end portions with pivoting snap fit connections for mating at both ends with like devices to form a smooth and uniform horizontal base segment that can lie flush or at angles to the horizontal ground surface. A back plate of varying configurations is attached to the base center portion for insertion into the soil to form a vertical sub-surface wall for both straight and cornered configurations. One or more spikes extending from the horizontal base doubly secures the device installation. A vertical back plate is positioned on the device for an above surface wall. The vertical back plate has brackets and an extension for connecting the vertical back plates in series.

23 Claims, 18 Drawing Sheets

LAWN AND GARDEN EDGING DEVICE

BACKGROUND OF THE INVENTION

1. Field of the Invention

The present invention relates generally to lawn and gardening devices and, more specifically, to a device that can be positioned in the ground, defining a border and preventing growth between the separated ground cover.

2. Description of the Prior Art

There are other lawn and gardening device designed for retaining and maintaining a specific lawn or garden appearance. Typical of these is the patent issued to Coates on Jul. 13, 1999 as U.S. Pat. No. 5,921,021, to Conway on Mar. 21, 2000, as U.S. Pat. No. 6,038,811, and U.S. Pat. No. 4,349,596 issued to Hendrix on Sep. 14, 1982.

Another patent was issued to Trageser on Feb. 8, 1983 as U.S. Pat. No. 4,372,079. Another patent was issued to Brylla et al on Mar. 7, 1989 as U.S. Pat. No. 4,809,459. Yet another U.S. Pat. No. 4,969,289 was issued to Trifiletti on Nov. 13, 1990 and still yet another was issued on Jun. 8, 1993 to Grimes as U.S. Pat. No. Des. 336,220.

Another patent was issued to Mantilla on Aug. 13, 1996 as U.S. Pat. No. 5,544,445. Yet another U.S. Pat. No. 5,857,288 was issued to Wiste on Jan. 12, 1999.

The lawn border and edging member of this invention has an elongated vertical wall member which has opposite vertical side surfaces, first and second opposite ends, and elongated top and bottom surfaces. A flat plate member is secured to the bottom surface of the wall member and has a width extending outwardly from each side of the wall member to maintain the wall member in a vertical position. The outer ends of the plate member extend longitudinally outwardly beyond each end of the wall member. The plate member has an offset portion on its bottom surface to receive an end extension portion of another juxta positioned member having an end extension portion of an horizontal slot to receive an end extension portion of another juxta positioned member having an end extension portion. The wall member has connecting means on it opposite ends for pivotal attachments to ends of similar wall members. The connecting means includes a tongue element on one of each ends and a size compatible horizontal notch on the other of the ends. A vertical hinge pin having a lower end, and a length greater than the height of the wall member extends through the overlapping tongue elements and horizontal notches. The hinge pins penetrate a ground surface upon which the member is mounted. The protruding ends of the plate members are in the shape of a semi-circle. Except for the hinge pins, the member described heretofore can be comprised of a single piece of molded material.

A lawn edging system and methods for edging a lawn are disclosed. The system includes a plurality of individual, integrally formed lawn edging units. Each unit includes a first portion and a substantially perpendicular second portion. The second portion includes a central section, having a length equal to the length of the first portion, and two end areas, which, when combined with the length of the central section, define a length greater than that of the first portion. The end areas are preferably rounded, but may be boxed, pointed, or scalloped. In use, an end area on one unit overlaps an end area of an adjacent unit while the first portions of the adjacent units abut. The second portion preferably includes an aperture for accepting a stake to anchor the unit into the ground. The aperture may be centrally located, or there may be a plurality of evenly spaced apertures. The design of the lawn edging device enables a plurality of lawn edging units to be nested compactly and packaged for sale or storage. In addition, the design of the lawn edging device enables the device to be either inserted into the ground to separate a grassy area from an adjacent ground area or placed against a vertical surface to separate the grassy area from the vertical surface. Thus two alternate methods of use are disclosed.

A material retainer strip for holding gravel in a roadway, lining a flower bed or garden plot and generally maintaining the integrity of two separate surface materials, comprising elongated, flexible resilient strips of material having a substantially C-shaped cross-section, the base lip thereof being wider than the top lip, the base lip being secured to a surface by stakes. Included are a plurality of splice joints of various shapes for connecting the ends of the strips either in alignment or to permit execution of an abrupt turn in direction.

The present invention entails a garden edging structure that surrounds a garden plot and separates the same from grass, vegetation, or soil that might lie outwardly of the garden plot. Specifically, the garden edging structure includes an inner continuous boundary or border that surrounds the garden plot and includes a lower ground engaging portion that anchors the same about the plot, and an above ground portion that tends to confine soil of the garden plot inwardly of the inner boundary. In addition, an outer boundary or border structure is provided and communicatively associated with the inner boundary structure. More particularly, the outer boundary structure is of a generally horizontal planar type material, such as vinyl, and extends about ground level continuously around the inner boundary. In the case where the garden plot is surrounded by grass, it is seen that the outer boundary would serve to support a portion of a lawn mower such that grass disposed about the outer edge thereof can be easily and cleanly cut.

An L-shaped lawn and garden edging has a leg that is inserted into the ground and a flange that rests on the ground to impede plant growth under the flange. When the edging is inserted into the ground adjacent a building or other above ground object, the grass adjacent the building need not be hand trimmed after the lawn is mowed with a mower. The present invention includes an edging having an upstanding retainer section joined to the junction of the leg and flange. The retainer section is useful for retaining selected above ground garden materials into desired areas. The flange may be slit to permit bending the edging into curved configurations. The ends of the edgings may be cut at an angle and placed into end facing contact to bound multi-sided areas. In a modified embodiment, the flange is pivotally connected to the leg by a hinge of material. The flange has a tongue that is selectively engageable with a groove in the leg to hold the flange rigidly to the leg and disengageable from the groove to permit folding the edging. In a further modified embodiment, the flange is a loose piece that has a pair of tongues that are slidable into a dovetail groove in the leg to permit selective use as a rigid edging and to permit rolling the flange and edging.

A garden edging device separates one area of a lawn from another. The edging device includes two upwardly facing generally flat elongated horizontal segments. Two elongated vertical segments, each integral with the first horizontal segment, depend downwardly from the first horizontal segment along the longitudinal edges of the horizontal segment. One of the elongated vertical segments is integral along it lower edge to one longitudinal edge of the second horizontal segment. An additional longitudinal vertical segment is integral with the second horizontal segment and depends downwardly from it. The upwardly facing segments are provided with recessed holes for receiving and countersinking the heads of stakes which secure the device to the ground. The device can be straight or curved and can be formed with folds permitting it to bent.

This device includes the ornamental design for the interlocking lawn and garden bed edging as illustrated in the drawings of the patent, including interlocking element.

A landscape edging device which is positioned about a border between a lawn or garden and a structure such as a sidewalk, driveway or building is characterized by a split horizontal member which is capable of downward displacement to allow mowers and other objects to traverse over the device, while providing sufficient height to be an effective barrier between the lawn and the structure. Gripping members are provided to allow the device to be fixed to the lawn.

Plastic extruded lawn edging includes a vertical panel and a horizontal panel that are reconfigurable to a storage position and an installed position. In the storage position, the lawn edging has a relatively low minimum moment of inertia for the flexibility of coiling about itself. In the installed position, the lawn edging has a higher minimum moment of inertia for greater rigidity when in use. The horizontal panel is wide enough to support the wheel of a lawnmower and provides a band along which no grass can grow. The horizontal panel eliminates the need for grass trimming wherever it is used, such as along side the outer wall of a house or around a garden.

While these lawn and garden edging devices may be suitable for the purposes for which they were designed, they would not be as suitable for the purposes of the present invention, as hereinafter described.

It is thus desirable to provide a lawn and garden edging device that is one modeled piece, that is comprised of a weather resistant material equipped with locking means that provide flexibility when being applied in various curved configurations. It is further desirable to provide a lawn and garden edging that allows for the transversion of lawn maintenance equipment over its edges with out causing inadvertent damage to the lawn and garden edging device or maintenance equipment.

SUMMARY OF THE PRESENT INVENTION

The present invention relates generally to lawn and gardening devices and, more specifically, to retaining and maintaining a specific lawn or garden appearance while reducing damage to already present lawn or garden environment.

A primary object of the present invention is to provide a lawn and garden edging device that may reduce unsightly weed and shrub build up at the base of an existing free standing structure.

Another object of the present invention is to provide a lawn and garden edging device that may eliminate the need for lawn trimming equipment.

Yet another object of the present invention is to provide a lawn and garden edging device that may act as an enclosure for flower beds.

Still yet another object of the present invention is to provide a lawn and garden edging device that may act as a border between two areas of selective land.

Yet another object of the present invention is to provide a lawn and garden edging device that may act as a decoration device.

Additional objects of the present invention will appear as the description proceeds.

The present invention overcomes the shortcomings of the prior art by providing a lawn and garden edging device with interlocking means therein and a stake providing means for securing the device in place.

The L-shaped edging device of the present invention is comprised of two transverse planar surfaces. One is embedded in the ground and the other is parallel with and engaging the ground surface. On the spaced apart distal ends are opposed locking elements whereby like L-shaped members can be fixedly attached thereto. One locking element is comprised of an aperture having a receiving flanged member while the other is comprised of a stud being of substantially similar diameter as the aperture and having a flanged circular member that works in conjunction with the flanged receiving member to provide the locking means for the L-shaped edging device.

The distal ends of the L-shaped edging device are contoured with rounded ends whereby mated L-shaped edging members will pivot on the locking element which provides means for a plurality of L-shaped edging devices forming a user selectable pattern from a circle to a line.

The L-shaped edging device may be of random lengths and width having threaded members and threaded apertures thereon that provide the coupling means for spikes having threaded members and threaded apertures thereon. The spike provides means for fixedly retaining the selective positioning of each L-shaped edging device. The spike is provided in two embodiments, one embodiment having a threaded member present at its top most end for the coupling with the threaded aperture of the L-shaped edging device. The second spike embodiment is furnished with a threaded aperture present at the top most end of the spike that provides the coupling means for the threaded member of the L-shaped edging device.

The present invention also provides a vertical back plate that extends above ground whereby the L-shaped form in now a T-shaped form. The above ground element provides means for having a higher grade on one side than the other such as, in the case of raised flower beds. The above grade element further has means for connection one edging device with another by having brackets located on the edge at one distal end and a flexible flap extension located on the other distal end. When two edging devices are mated the flap is inserted into the grooves, thereby preventing soil from the raised bed from passing from the higher grade to the lower grade through the seam. The flap further permits the rotation of one device relative to the other through the locking element.

The present invention also provides an embodiment that functions in ways similar to the first two embodiments yet only provides a minimum angle of rotation due to its modified planar surface.

A lawn edging device is provided, comprising: a first elongated member having: a center portion having an edge; a first end portion and a second end portion, each extending from the center portion, the first end portion being attachable to the second end portion of a like device, the second end portion being attachable to the first end portion of a like device, the first and second end portions being sized such that, when attached, the combined thicknesses of the first end portion and the second end portion of the like device are substantially the same as the thickness of the center portion; and a second elongated member having an edge, the second elongated member being attached to the first elongated member such that the first and second elongated members form a vertex at the attached edges.

In another embodiment, the attachment is pivotable in the plane of the first elongated member.

In another embodiment, the device further comprises a spike, the spike being downwardly disposed and attached to the first elongated member.

In another embodiment, the spike has a threaded member and the first elongated member has a threaded aperture, the spike threaded member being matable with the first elongated member threaded aperture.

In another embodiment, the spike has a threaded aperture and the first elongated member has a threaded member, the spike threaded aperture being matable with the first elongated member threaded member.

In another embodiment, the device further comprises a plurality of spikes, the spikes being downwardly disposed and attached to the first elongated member.

In another embodiment, the second elongated member extends along the combined lengths of the center portion and the first end portion.

In another embodiment, the second elongated member extends along the combined lengths of the center portion and the second end portion.

In another embodiment, the second elongated member extends along the combined lengths of the center portion, the first end portion, and the second end portion.

In another embodiment, the device further comprises a third elongated member, the third elongated member having an edge and being attached to the first elongated member edge such that the second and third elongated members lie in the same or substantially parallel planes.

In another embodiment, the device further comprises an extension member extending from the third elongated member; and a first and second bracket positioned on the third elongated member for closely receiving the extension member of a like device such that the third elongated member is joined to the third elongated member of the like device.

In another embodiment, the extension member is flexible.

In another embodiment, the extension member is offset from the third elongated member such that the extension member is linearly aligned with the first and second brackets.

In another embodiment, the device further comprises a third elongated member, the third elongated member having an edge and being positionable upon the first elongated member edge such that the first and third elongated members form a vertex at the attached edges.

In another embodiment, the device further comprises a third elongated member, the third elongated member being positionable on the first elongated member; an extension member extending from the third elongated member; and a first and second bracket positioned on the third elongated member for closely receiving the extension member of a like device such that the third elongated member is joined to the third elongated member of the like device.

In another embodiment, the extension member is flexible.

In another embodiment, the extension member is offset from the third elongated member such that the extension member is linearly aligned with the first and second brackets.

In another embodiment, the third elongated member has a forward surface, and wherein the first bracket has a generally planar bottom surface, the bottom surface forming a substantially right angle with the third elongated member forward surface, the third elongated member being positioned upon the first elongated member by nestling the first elongated member within the right angle.

In another embodiment, the first end portion is semi-circular in the plane of the first elongated member.

In another embodiment, the center portion extends over the second end portion, the center portion extension being arcuately shaped to closely receive the semi-circular first end portion of a like device.

In another embodiment, the second end portion is semi-circular in the plane of the first elongated member.

In another embodiment, the first and second end portions are semi-circular in the plane of the first elongated member.

In another embodiment, the first end portion further comprises a male locking extension and the second end portion comprises a female receptacle, the female receptacle being shaped for receiving and securing the male locking extension on the first end portion of a like device.

A lawn edging device is provided, comprising: a first elongated member having: a center portion having an edge; a first end portion and a second end portion, each extending from the center portion, the first end portion being attachable to the second end portion of a like device, the second end portion being attachable to the first end portion of a like device, the first and second end portions being sized such that, when attached, the combined thicknesses of the first end portion and the second end portion of the like device are substantially the same as the thickness of the center portion; and a second elongated member attached to the first elongated member such that the plane of the first elongated member is transverse to the plane of the second elongated member.

In another embodiment, the device further comprises an extension member extending from the second elongated member; and a first and second bracket positioned on the third elongated member for closely receiving the extension member of a like device such that the second elongated member is joined to the second elongated member of the like device.

In another embodiment, the extension member is flexible.

In another embodiment, the extension member is offset from the second elongated member such that the extension member is linearly aligned with the first and second brackets.

A lawn edging device is provided, comprising: a first elongated member having: a center portion having an edge; a first end portion and a second end portion, each extending from the center portion, and means for attaching the first end portion being to the second end portion of a like device and the second end portion to the first end portion of a like device, the first and second end portions being sized such that, when attached, the combined thicknesses of the first end portion and the second end portion of the like device are substantially the same as the thickness of the center portion; and a second elongated member having an edge, the second elongated member being attached to the first elongated member such that the first and second elongated members form a vertex at the attached edges.

In another embodiment, the attachment means further comprises a snap-fit fastener.

In another embodiment, the device further comprises a third elongated member and means for positioning the third elongated member on the first elongated member such that the third elongated member extends upwardly from the plane of the first elongated member.

In another embodiment, the third elongated member has an extension and means for securing the extension of a like third elongated member.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is a perspective view of the invention. Shown is a free standing structure flanked by several of the lawn and garden edging devices. Shown also is the intricate overlapping placement of the lawn and garden edging devices. Also shown is the horizontal segment of the lawn and garden edging device as it is positioned above the grass and sediment at the base of a free standing structure. Shown also is the lawn and garden edging device and its ability to form curved and corner configurations.

FIG. 2 is a perspective view showing the lawn and garden edging device configured as a flower bed or gardening retainer. Shown is an embodiment of the lawn and garden edging device with its back plate. Also shown is the mating relationship of two of the lawn and garden edging devices as they are used in conjunction to form a flower bed corner.

Figure 5:
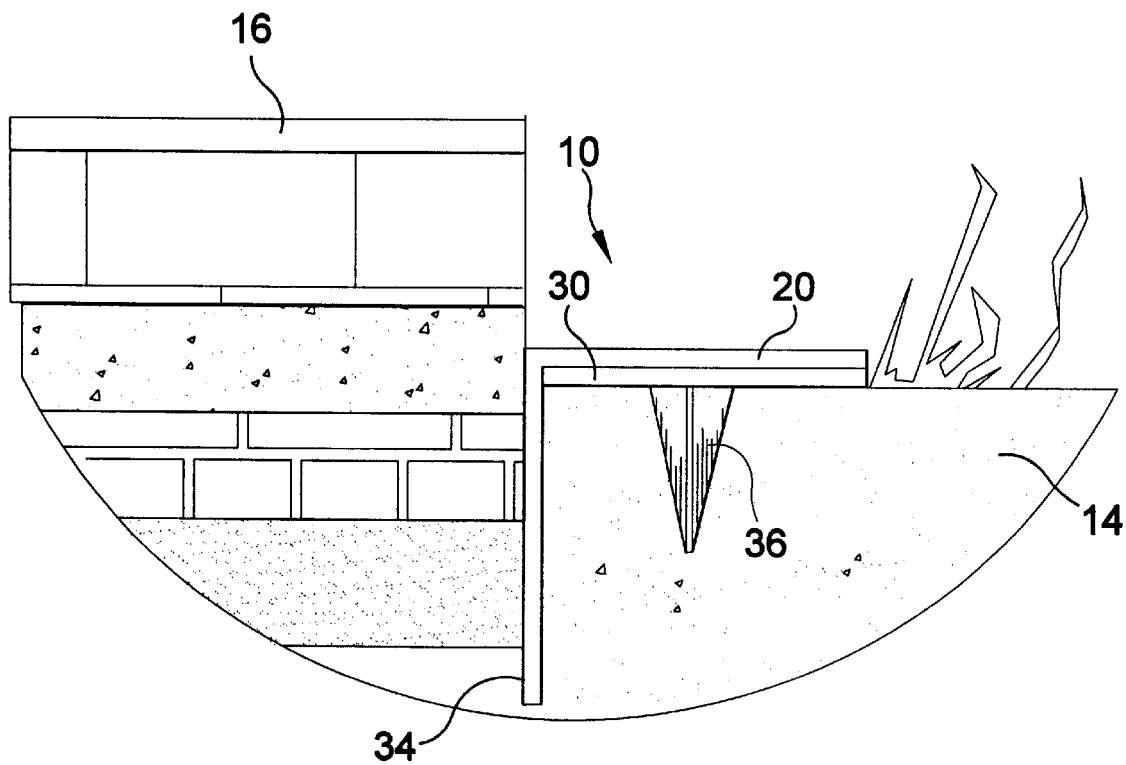

FIG. 5 is a side view showing the lawn and garden edging device as it relates to the vertical surface of a free standing structure. Shown is the lawn and garden edging device implanted into the soil that surrounds the edge of a free standing structure. Also shown is the relationship of the back plate and the spike as each secure the device in the soil. Shown also is the relations between the lawn and the horizontal base portion of the lawn and garden device. Also shown is the proper placement of the spike into the grass or sediment to provide best anchorage of the lawn and garden edging device.

Figure 6:
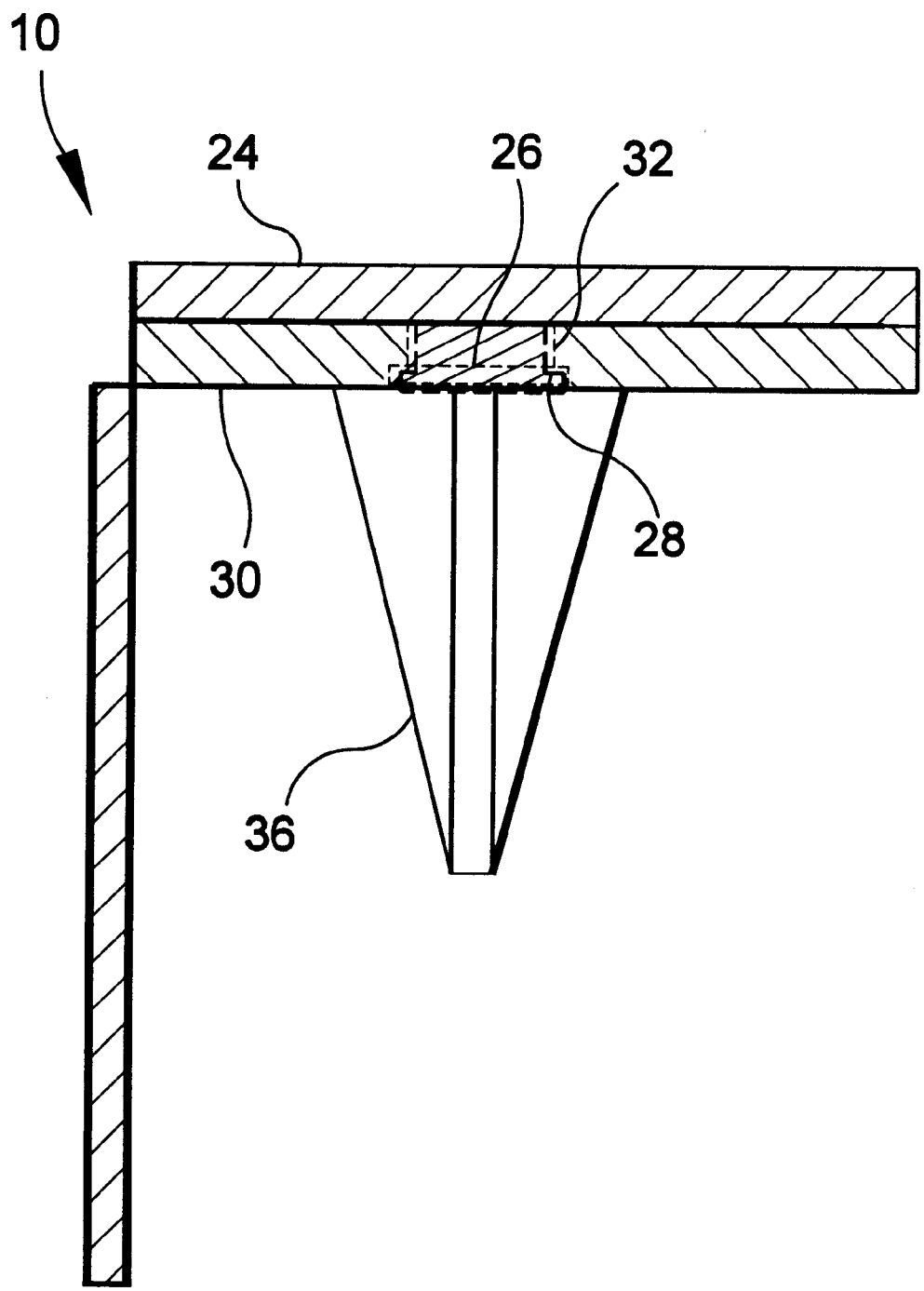

FIG. 6 is a sectional view of the lawn and garden edging device. Shown is the mating relationship of the male locking extension and the female receptacle of two individual lawn and garden edging devices.

Figure 7:
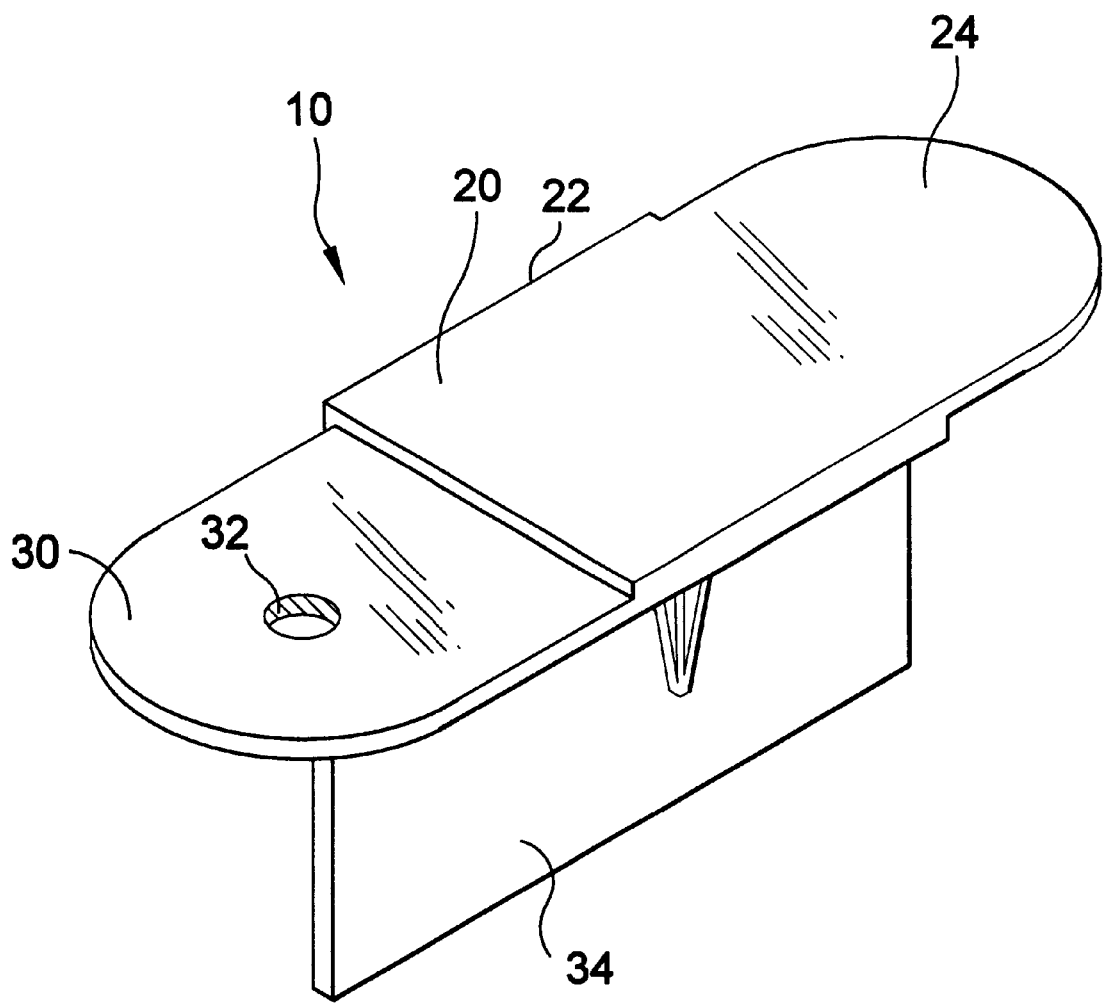

FIG. 7 is a perspective view showing the lawn and garden edging device.

Figure 8:
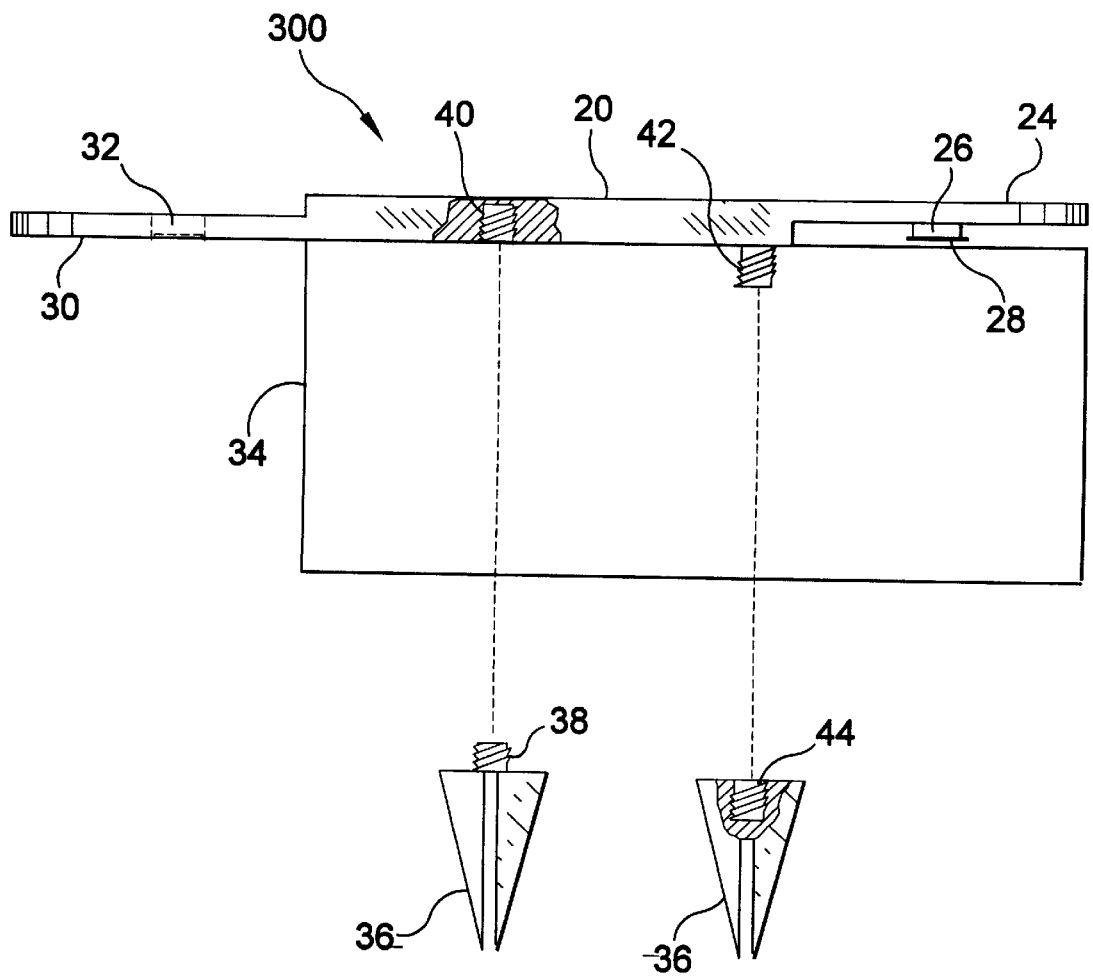

FIG. 8 is front view of an embodiment having two spikes. Shown is the relationship of the intricate parts of the lawn and garden edging device, including the male locking extension and the female receptacle which are the interlocking means of the lawn and garden edging device located at each distal end of the lawn and garden edging device. Shown also are a plurality of spikes having threaded retaining and locking means thereon. Also shown are the mating relations between the plurality of spikes having threaded apertures and threaded members as they relate to the base of the lawn and garden edging device and its threaded apertures and threaded members.

Figure 9:
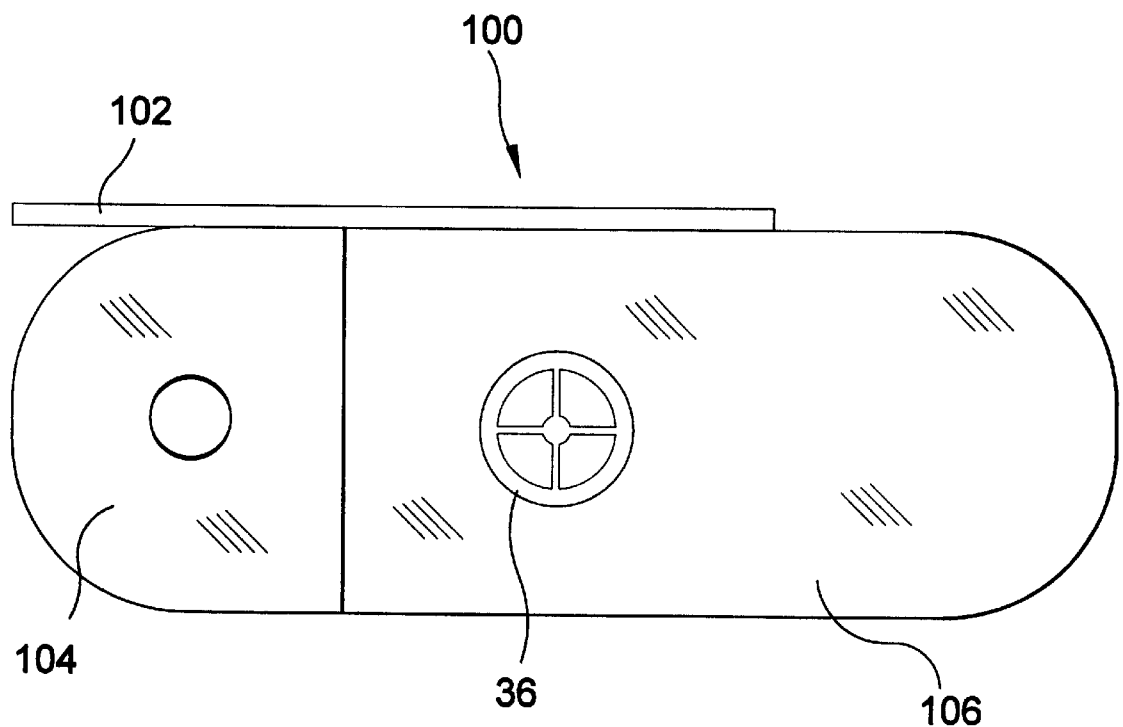

FIG. 9 is a bottom view of an embodiment of the lawn and garden edging device, where the back plate extends rearwardly instead of forwardly. The linear displacement of the base center portion, end portions, back plate, male connecting extension and female receptacle are shown.

Figure 10:
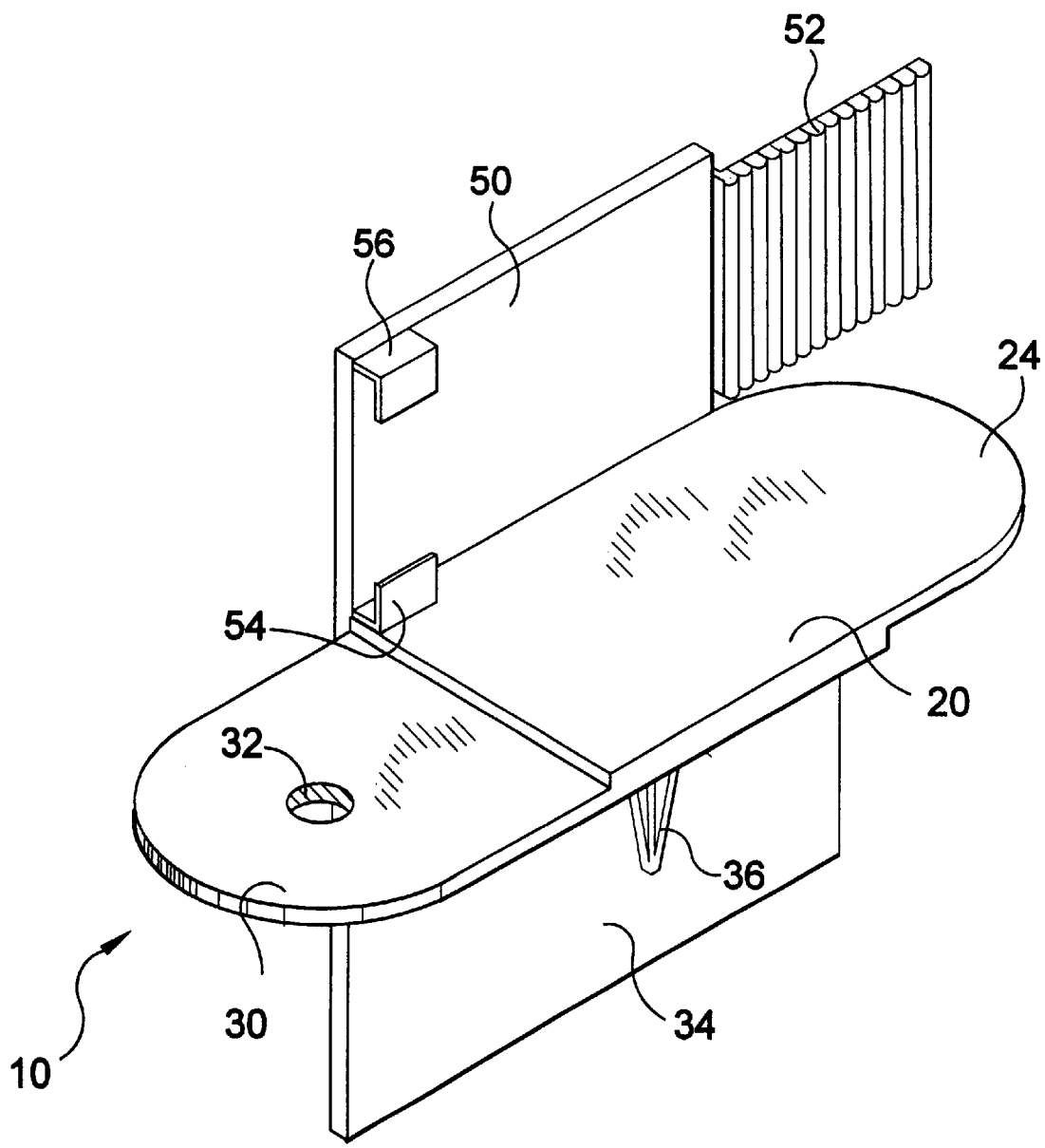

FIG. 10 is a perspective view showing the lawn and garden edging device with a vertical back plate positioned on the center base portion. Shown also are the retaining brackets on the vertical back plate, the lower bracket resting on the base center portion. Shown also is the vertical back plate extension.

Figure 11:
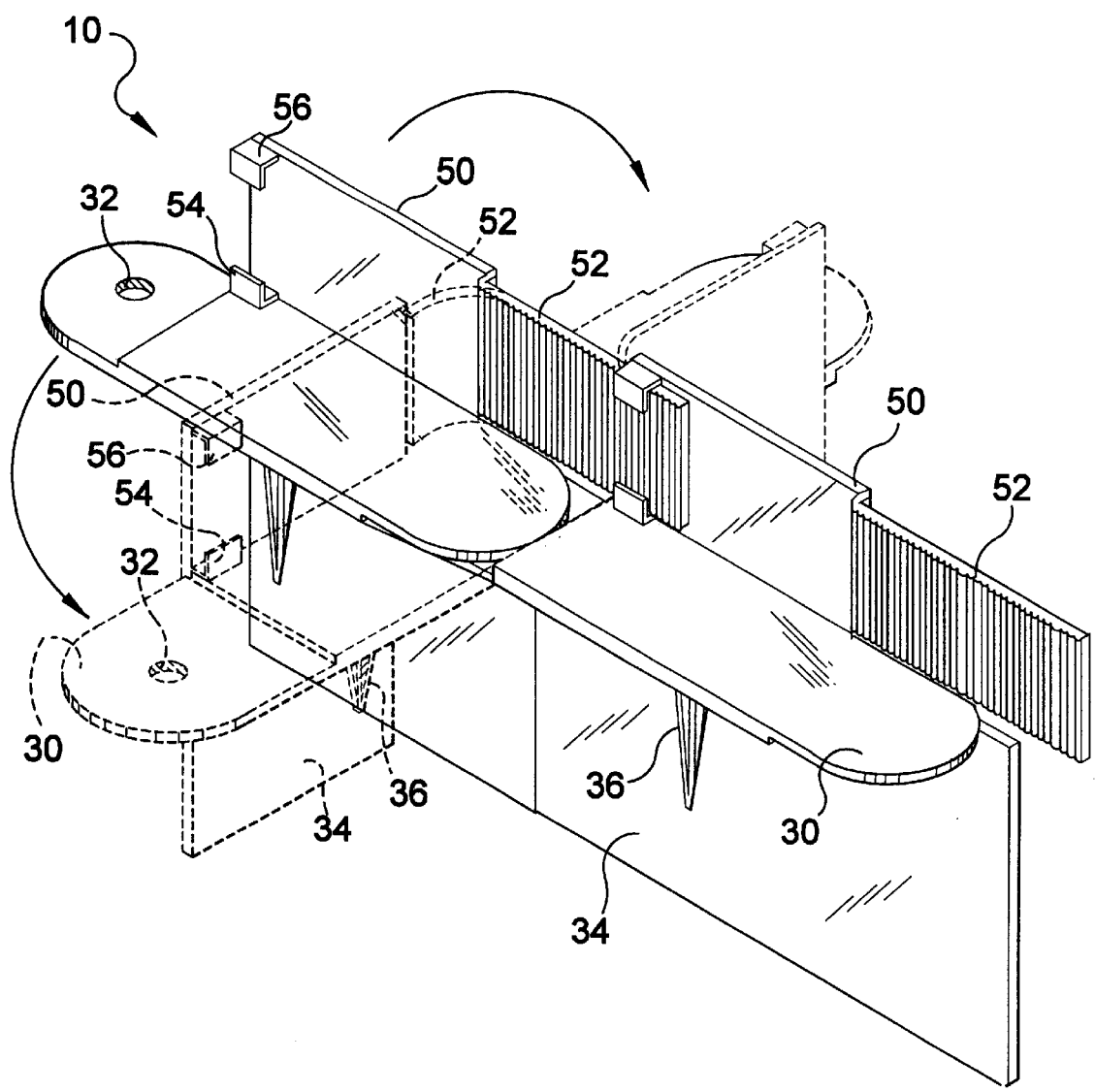

FIG. 11 is a perspective view showing the lawn and garden edging device with fully positioned and assembled vertical back plates and vertical back plate extensions. Also shown is the functional relationship of two of the lawn and garden edging devices as they are used in conjunction to form a flower bed. Shown also is the mounting and pivoting functions of the lawn and garden edging device if two of the devices were coupled together to form corners or other obtuse angles. Also shown is the mating relationship of the vertical back plate extension as it is received and secured by the extension brackets of the other lawn and garden edging device.

Figure 12:
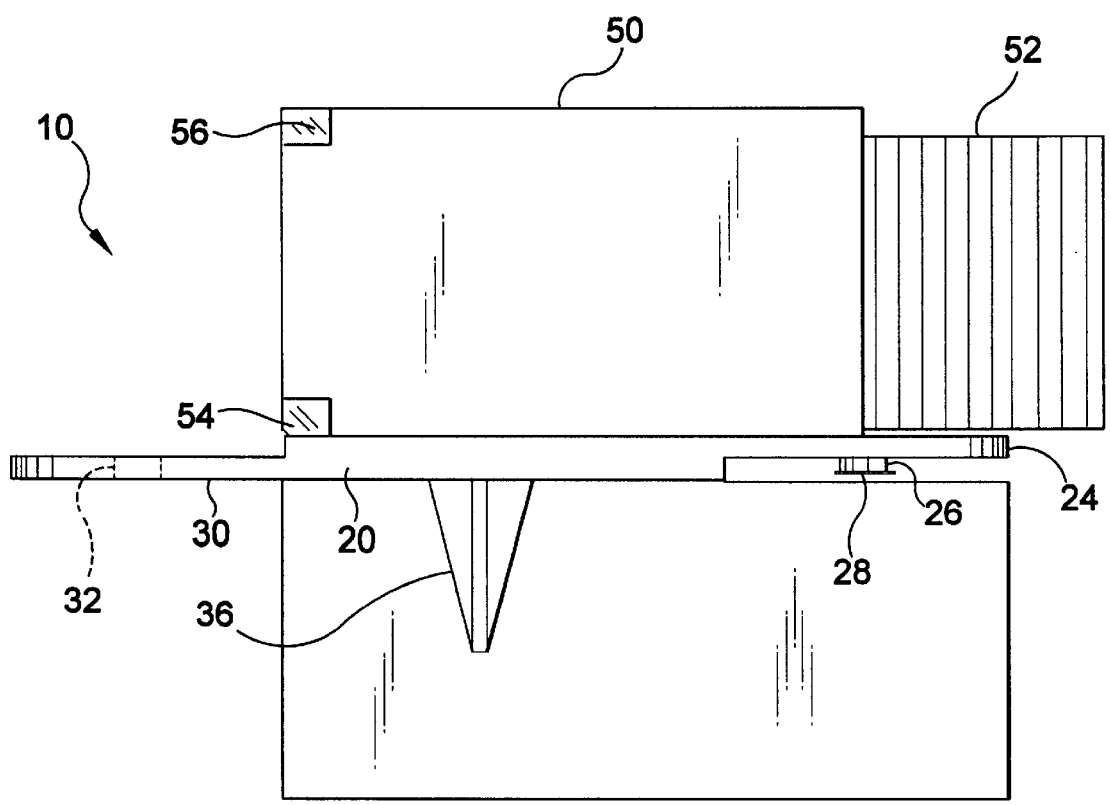

FIG. 12 is front view of the lawn and garden edging device. Shown is the displacement relationship of the intricate parts of the lawn and garden edging device with the vertical back plate assembly included. Also shown is male locking extension and the female receptacle which are the interlocking means of the lawn and garden edging device located at each distal end of the lawn and garden edging device.

Figure 13:
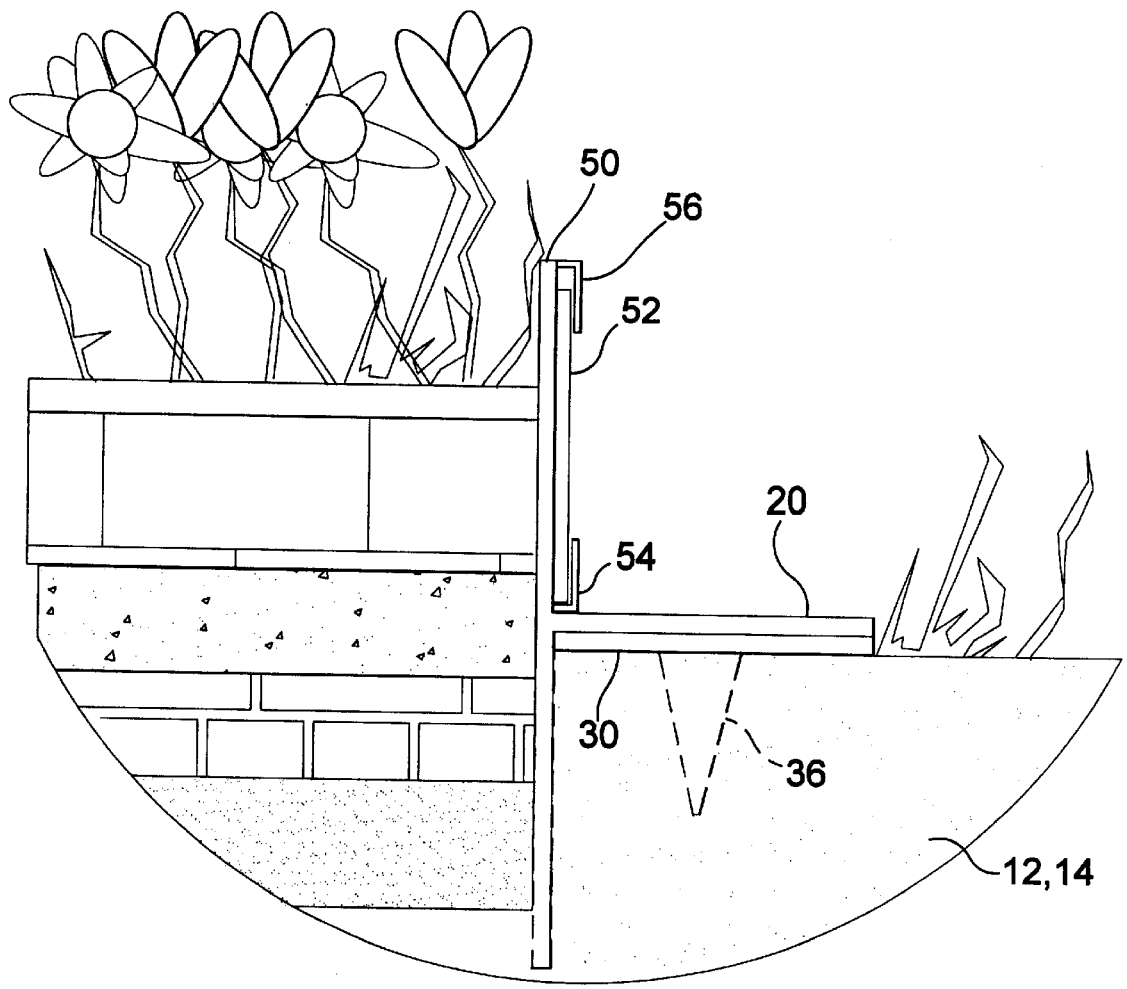

FIG. 13 is a side view showing the lawn and garden edging device embodiment where the vertical back plate is integral with the base center portion. Shown is a lawn and garden edging device as it relates to the vertical surface of a free standing structure. Shown is the lawn and garden edging device implanted into the soil that surrounds the edge of a flower bed or a selective gardening arrangement. Shown also is the relations between the grass and the horizontal segment of the lawn and garden device. Also shown is the proper placement of the spike into the grass or sediment which surrounds the flower bed or selective gardening arrangement. Shown also is the relation of the vertical back plate and the free standing structure.

Figure 14:
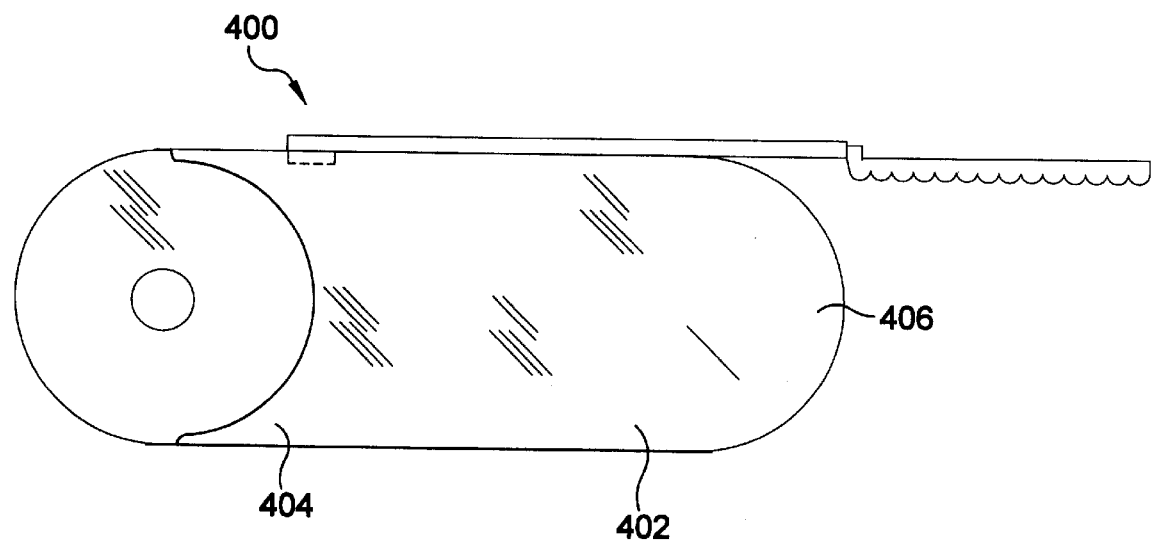

FIG. 14 is a top view of an embodiment of the lawn and garden edging device where an arcuate portion extends from the base center portion on to the second end portion for mating with the semi-circular first end portion of a like device. This embodiment insures proper linear alignment of the device as it interlocks to a plurality of the devices. Shown also is the linear displacement relations between several of the parts located on the horizontal segment, including the positioned vertical back plate and vertical back plate extension.

Figure 15:
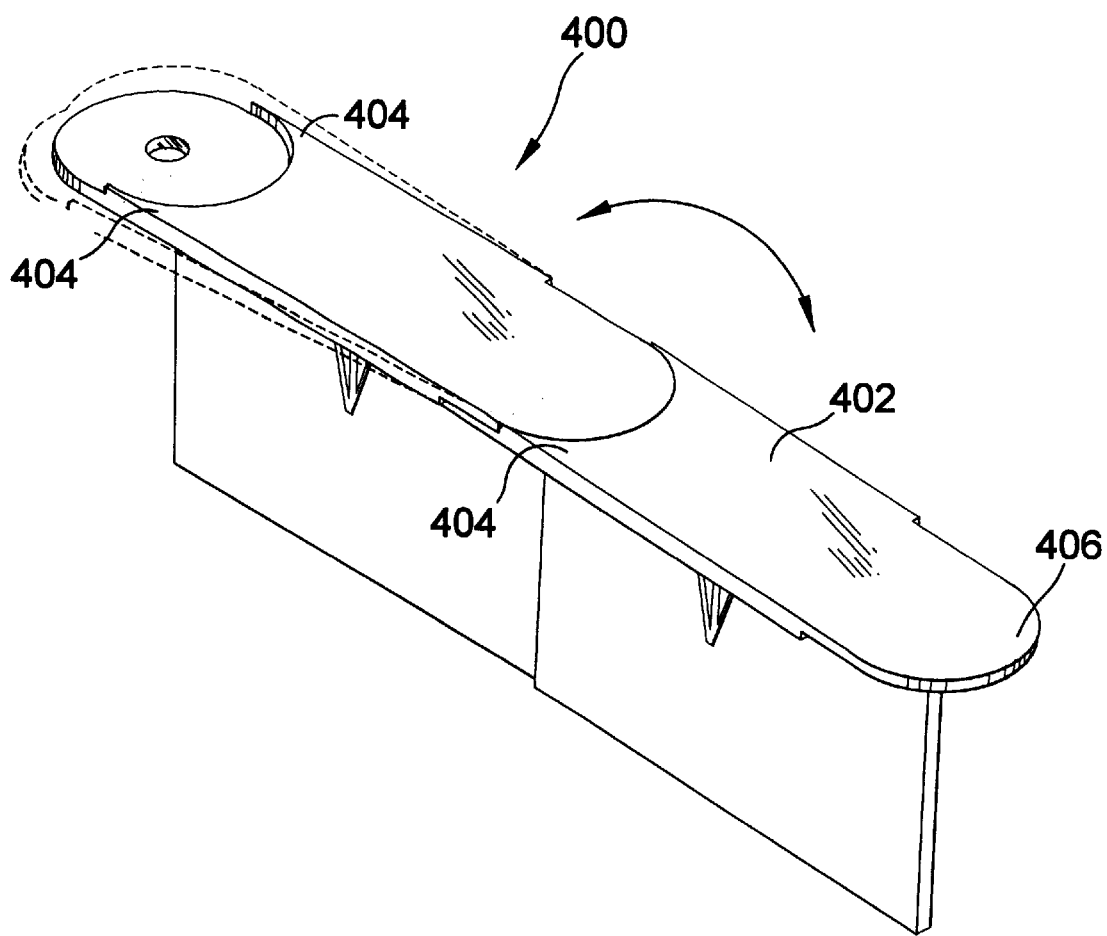

FIG. 15 is a perspective view showing the lawn and garden edging device embodiment with the arcuate extension of the base center portion on to the second end portion. The arcuate portion is mated with the semi-circular first end portion of a like device. Shown also is the mounting and limited pivoting function of the lawn and garden edging device if two of the devices were coupled together to form borders or other obtuse angles.

Figure 16:
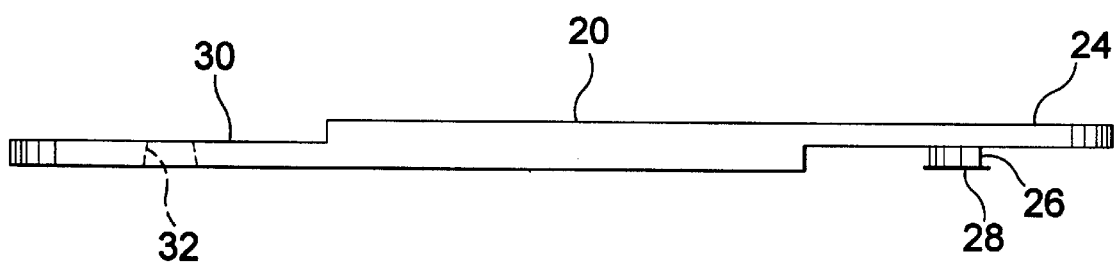

FIG. 16 is a partial side view of the device, omitting the back plate. Shown is the linear displacement relationship of the male locking extension and the female receptacle.

Figure 17:
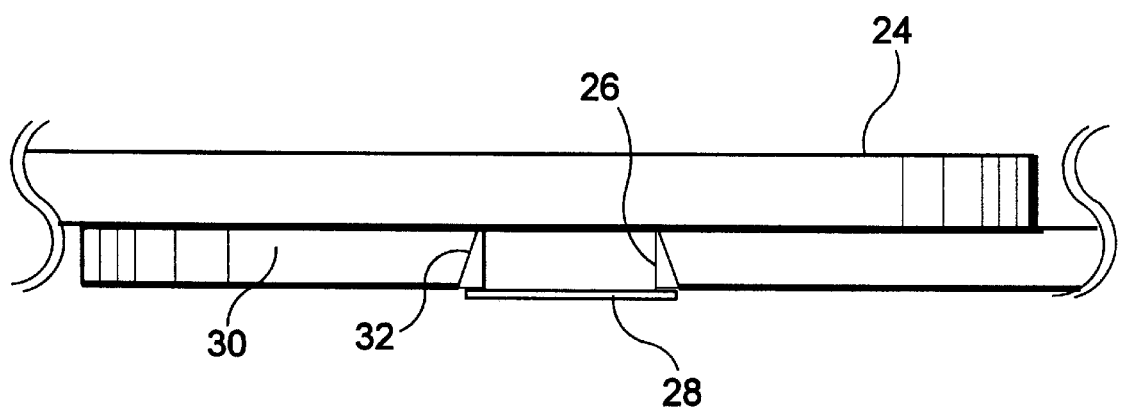

FIG. 17 is a partial side view depicting part of the first end portion of one device mated with part of the second end portion of a like device. Shown is the mating relationship of the male locking extension and the female receptacle when two individual lawn and garden edging devices are joined.

Figure 18:
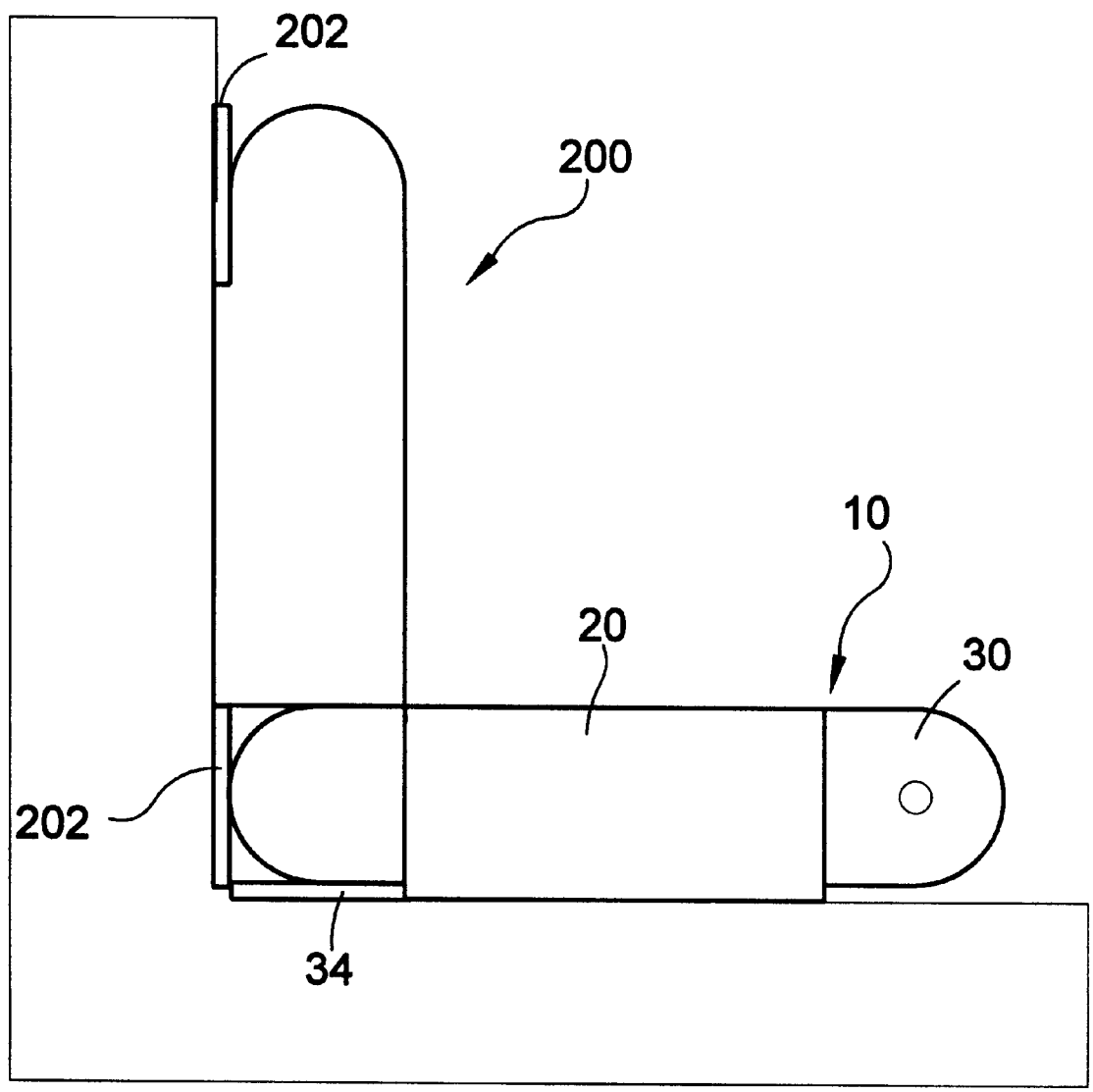

FIG. 18 is a top view of the device mated with an additional embodiment of the device where the back plate extends both forwardly and rearwardly. Shown is the ability of this special combination to provide a continuous vertical surface against the interior corner of a free standing structure. The continuous vertical surface results from the meeting of the back plates when the mated devices are pivoted to a right angle.

DESCRIPTION OF THE REFERENCED NUMERALS

Turning now descriptively to the drawings, in which similar reference characters denote similar elements throughout the several views, the figures illustrate the Lawn and Garden Edging Device of the present invention. With regard to the reference numerals used, the following numbering is used throughout the various drawing figures.
10 Lawn and Garden Edging Device of the present invention
12 lawn
14 garden
16 building structure
20 base center portion
22 base center portion edge
24 first end portion
26 male connecting extension
28 male connecting extension enlarged portion
30 second end portion
32 female receptacle
34 back plate
36 spike
38 threaded member
40 threaded aperture
42 threaded member
44 threaded aperture
50 vertical back plate
52 vertical back plate extension
54 vertical back plate first bracket
56 vertical back plate second bracket
100 additional embodiment
102 back plate
104 second end portion
106 first end portion
200 additional embodiment
202 back plate
300 additional embodiment
400 additional embodiment
402 base center portion
404 arcuate portion
406 first end portion

DETAILED DESCRIPTION OF THE PREFERRED EMBODIMENTS

Turning now descriptively to the drawings, in which similar reference characters denote similar elements throughout the several views, FIGS. 1–18 illustrate the Lawn and Garden Edging Device of the present invention indicated generally by the numeral 10.

Figure 1:
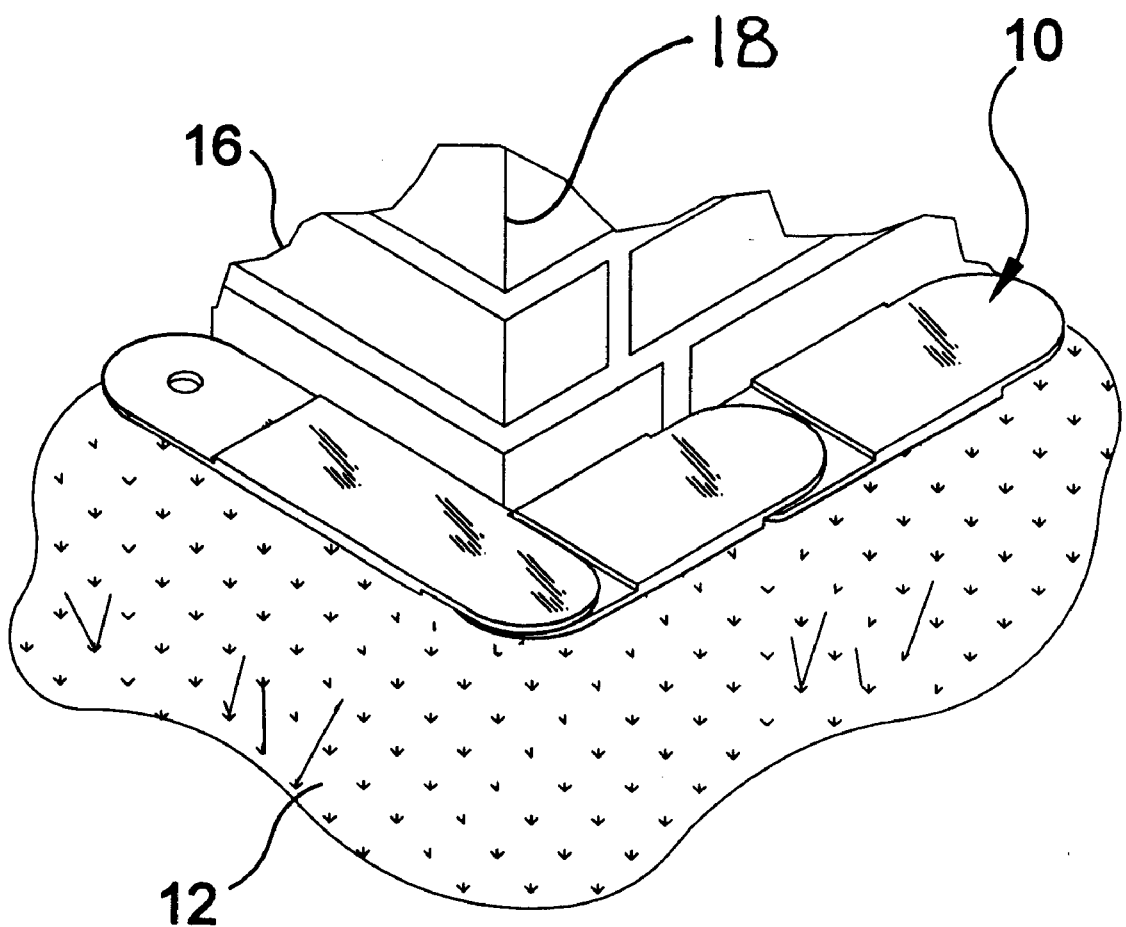

The devices 10, 100, 200, 300, 400 are shown generally in FIGS. 1–18, and in use in FIGS. 1, 5, and 13. The device 10 is used in lawn 12 and garden 14 applications including those that abut building structures 16. In a typical application numerous devices 10 are employed and attached in series, with directional changes as necessary. For example, FIG. 1 depicts four of the devices 10 isolating a lawn 12 from a building exterior corner 18.

Figure 2:
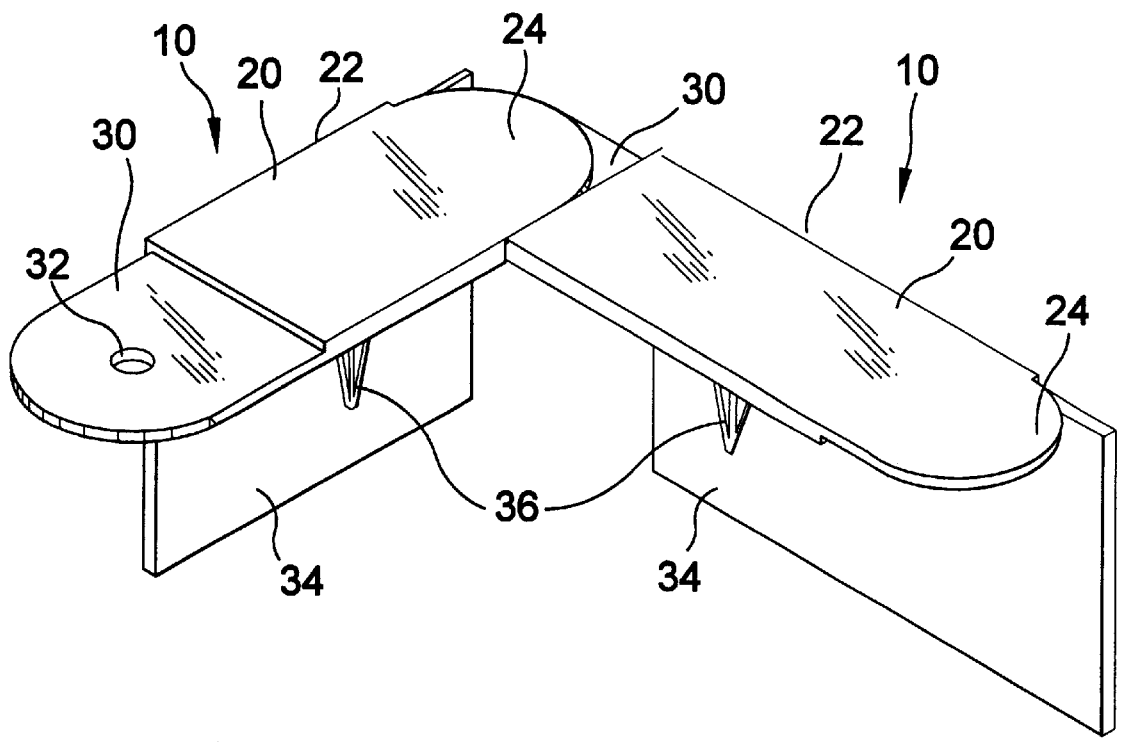

As shown in FIGS. 2 and 16, the device 10 has a center base portion 20 with an edge 22, a first end portion 24, a male connecting extension 26 with an enlarged end 28, a second end portion 30, a female receptacle 32 in the second end portion 30, a back plate 34 attached along the edge 22 of the base center portion 20, and spike 36 extending downwardly from the base center portion 20. The back plate 34 can be oriented at any desired angle with respect to the base center portion 20, including the right angle shown in FIGS. 5 and 6.

As shown in FIG. 5, the back plate 34 is driven into the ground, the spike 36 being simultaneously driven to doubly secure the installation and to set the angle the base center portion 20 makes with the horizontal.

Figure 3:
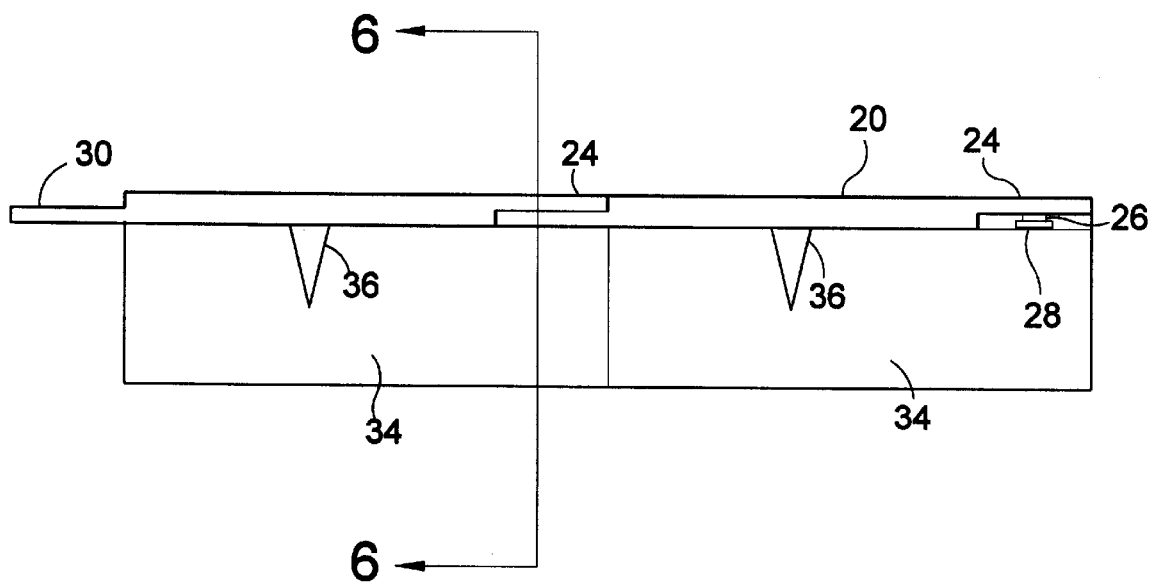
FIG. 3 is a front view showing the smooth and uniform horizontal surface formed by two linearly aligned lawn and garden edging devices after being joined.
Figure 4:
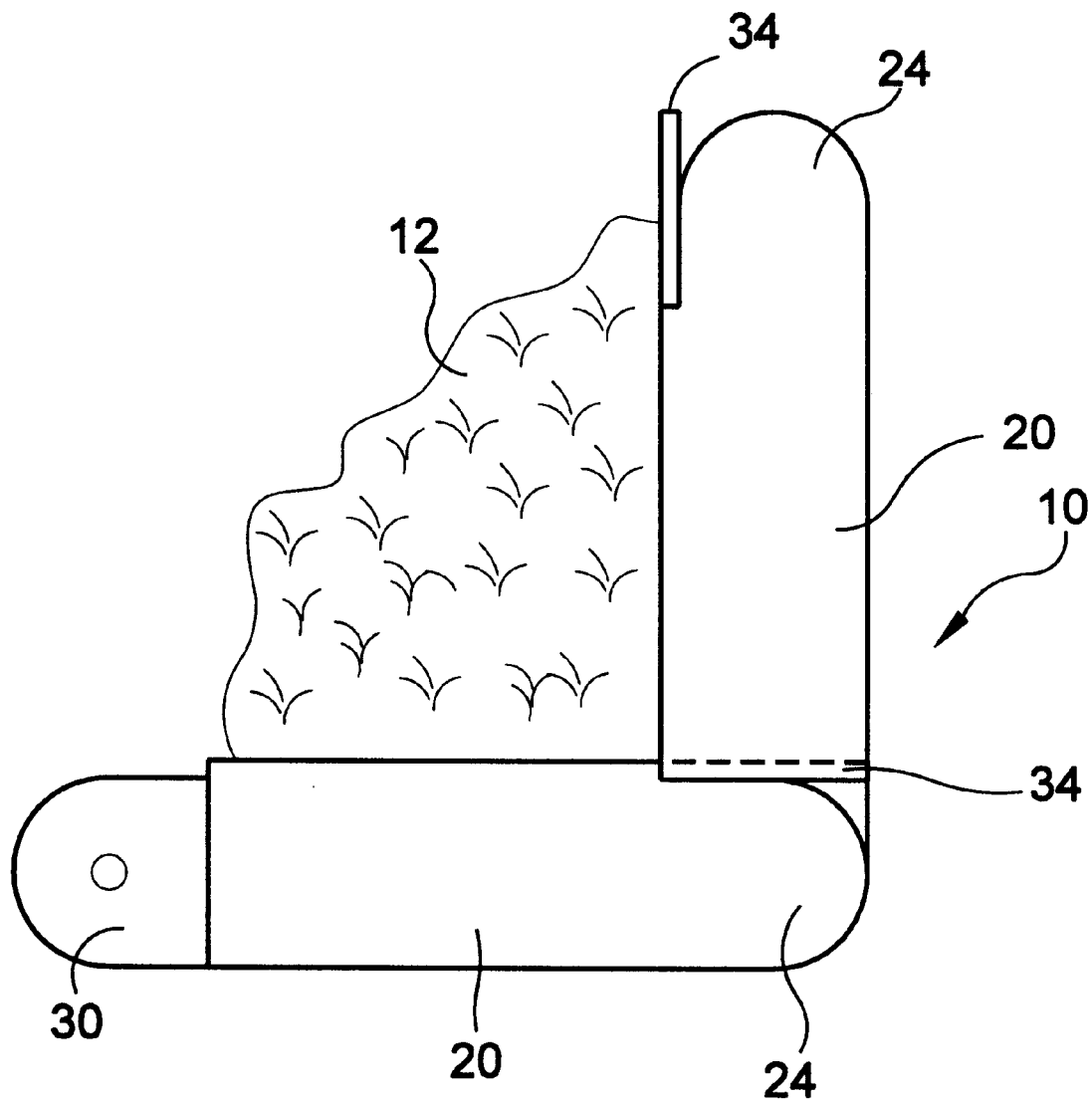
FIG. 4 is a top view of two of the lawn and garden devices mated and oriented such that the back plates form a continuous vertical surface for the exterior corner of a lawn. After mating the two devices one is pivoted counter-clockwise until its back plate abuts the back plate of the other device.

As shown in FIGS. 2 and 3, the first end portion 24 and second end portion 30 are semi-circular at their ends and each has a reduced thickness as each extends from the base center portion 20. The reduction in thickness is chosen for each such that, when the first end portion 24 is attached to the second end portion 30 of a second and like device 10, the combined thicknesses of such end portions 24, 30 are substantially the same as the thickness of the base center portion 20. FIG. 3 shows the smooth, uniform appearance of two devices 10 so joined in a linear arrangement.

In the preferred embodiment, the back plate 34 extends beyond the base center portion 20 to coincide with the end of the second end portion 30. As shown in FIG. 3, this extension enables the alignment and abutment of the forward end of the back plate 34 against the rearward end of the back plate 34 in the second and like device 10.

A similar result can be achieved in other embodiments such as the device 100 where the back plate 102 extends in the direction of the second end portion 104 and coincides with the end of the second end portion 104, with no extension toward the first end portion 106. This embodiment is shown in FIG. 9.

FIG. 18 depicts another embodiment 200, where the back plate 202 extends in both directions in similar fashion in order to provide abutment of one back plate 34 with another 202 in interior corners of building structures. This special version 200 is used in combination with the unmodified device 10 for this special purpose.

FIG. 16 is a closer view of the base center portion 20 and end portions 24, 30 where the male locking extension 26 and its enlarged end portion 28 are shown along with the female receptacle 32. FIG. 17 shows two devices 10 that are joined by the mating of the male locking extension 26 and the female receptacle 32. The reduction in diameter of the female receptacle 32 at the top surface of the second end portion 30 forces the temporary deformation of the male locking extension 26, enlarged end portion 28, and/or the female receptacle 32, as the male locking extension 26 is forced into the female receptacle 32. One or more of the male locking extension 26, the enlarged end portion 28, or the second end portion 30 are made from a deformable material for this purpose. When the enlarged end portion 28 has been inserted to the larger diameter lower portions of the female receptacle 32, it is prevented from exiting the female receptacle 32 absent the application of a concentrated upward force. As a result, the devices 10 are held together until the user specifically chooses to separate them by applying such a force.

The spike 36 can be formed as part of the base center portion 20 or, as in the preferred embodiment, can have a threaded member 38 for screwing into a threaded aperture 40, as shown in FIG. 8. FIG. 8 also illustrates an alternative attachment wherein a threaded member 42 extends downwardly from the base center portion 20 and a threaded aperture 44 is provided in the spike 36. An embodiment having a plurality of spikes 36 on a single device 300 is also illustrated by FIG. 8.

In applications such as the one shown in FIG. 13, it will be desirable to have a vertical back plate 50 rising above the base center portion 20. This vertical back plate 50 can be integrated with the base center portion 20, as shown in FIG. 13, or it can be a separate vertical back plate 50 that is positionable on the base center portion 20, as shown in FIG. 10.

The vertical back plate 50 on one device 10 can be brought adjacent the vertical back plate 50 on a second device 10 by extending the vertical back plate 50 forwardly, rearwardly, or both, in the same manner that the back plate 34 was extended, as described above. Alternatively, as shown in FIGS. 10–14, a vertical back plate extension 52 is provided. First and second vertical back plate extension brackets 54, 56 are attached to the vertical back plate 50, and are positioned to accept the insertion of the vertical back plate extension 52. After insertion the vertical back plate extension 52 is secured so as to provide a seamless continuation of the vertical back plate 50, as shown in FIG. 11.

The vertical back plate extension 52 can be offset as shown in FIG. 11, for improved alignment with the vertical back plate extension brackets 54, 56. A rigid or flexible material can be used for the vertical back plate extension 52.

As further shown in FIG. 11, cornering is enabled by pre-angled rigid vertical back plate extensions 52 or by choosing a flexible material.

FIG. 10 depicts a positionable vertical back plate 50 configuration where the first vertical back plate extension bracket 54 forms a notch that receives the edge 22 of the base center portion 20, thus supporting the vertical back plate 50.

FIGS. 15 and 16 illustrate another embodiment of device 400 in which the base center portion 402 includes an arcuate portion 404 shaped to mate with the semi-circular end 406 of a like device 400 or the device 10. This mating provides linear alignment stability by preventing excessive non-linearity in attached devices 400.

Although various plastics are the material of choice, the components of the devices 10, 100, 200, 300, 400 discussed above can be constructed from various woods, metals or plastics, all in accordance with the present invention, and as determined by the intended end use for the overall device 10, as will occur to those of skill in the art upon review of the present disclosure.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lawn edging device, comprising:
   a first elongated member having:
      a center portion having an edge;
      a first end portion and a second end portion, each extending from the center portion, the first end portion being attachable to the second end portion of a like device, the second end portion being attachable to the first end portion of a like device, the first and second end portions being sized such that, when attached, the combined thicknesses of the first end portion and the second end portion of the like device are substantially the same as the thickness of the center portion;
   a second elongated member having an edge, the second elongated member being attached to the first elongated member such that the first and second elongated members form a vertex at the attached edges;
   third elongated member, the third elongated member having an edge and being attached to the first elongated member edge such that the second and third elongated members lie in the same or substantially parallel planes; and
   an extension member extending from the third elongated member; and first and second brackets positioned on the third elongated member for closely receiving the extension member of a like device such that the third elongated member is joined to the third elongated member of the like device.

2. The device of claim 1, further comprising a spike, the spike being downwardly disposed and attached to the first elongated member.

3. The device of claim 2, wherein the spike has a threaded member and the first elongated member has a threaded aperture, the spike threaded member being matable with the first elongated member threaded aperture.

4. The device of claim 2, wherein the spike has a threaded aperture and the first elongated member has a threaded member, the spike threaded aperture being matable with the first elongated member threaded member.

5. The device of claim 1, further comprising a plurality of spikes, the spikes being downwardly disposed and attached to the first elongated member.

6. The device of claim 1, wherein the second elongated member extends along the combined lengths of the center portion and the first end portion.

7. The device of claim 1, wherein the second elongated member extends along the combined lengths of the center portion and the second end portion.

8. The device of claim 1, wherein the second elongated member extends along the combined lengths of the center portion, the first end portion, and the second end portion.

9. The device of claim 1, wherein the extension member is flexible.

10. The device of claim 1, wherein the extension member is offset from the third elongated member such that the extension member is linearly aligned with the first and second brackets.

11. The device of claim 1, wherein the first end portion is semi-circular in the plane of the first elongated member.

12. The device of claim 11, wherein the center portion extends over the second end portion, the center portion extension being arcuately shaped to closely receive the semi-circular first end portion of a like device.

13. The device of claim 1, wherein the second end portion is semi-circular in the plane of the first elongated member.

14. The device of claim 1, wherein the first and second end portions are semi-circular in the plane of the first elongated member.

15. The device of claim 1, wherein the first end portion further comprises a male locking extension and the second end portion comprises a female receptacle, the female receptacle being shaped for receiving and securing the male locking extension on the first end portion of a like device.

16. A lawn edging device, comprising:
    a first elongated member having:
        a center portion having an edge;
        a first end portion and a second end portion, each extending from the center portion, the first end portion being attachable to the second end portion of a like device, the second end portion being attachable to the first end portion of a like device, the first and second end portions being sized such that, when attached, the combined thicknesses of the first end portion and the second end portion of the
    like device are substantially the same as the thickness of the center portion;
    a second elongated member attached to the first elongated member such that the plane of the first elongated member is transverse to the plane of the second elongated member; and
    an extension member extending from the second elongated member; and first and second brackets positioned on a third elongated member for closely receiving the extension member of a like device such that the second elongated member is joined to the second elongated member of the like device.

17. The device of claim 16, wherein the extension member is flexible.

18. The device of claim 17, wherein the extension member is offset from the second elongated member such that the extension member is linearly aligned with the first and second brackets.

19. A lawn edging device, comprising:
    a first elongated member having:
        a center portion having an edge;
        a first end portion and a second end portion, each extending from the center portion, and means for attaching the first end portion being to the second end portion of a like device and the second end portion to the first end portion of a like device, the first and second end portions being sized such that, when attached, the combined thicknesses of the first end portion and the second end portion of the like device are substantially the same as the thickness of the center portion a
    second elongated member having an edge, the second elongated member being attached to the first elongated member such that the first and second elongated members form a vertex at the attached edges; and
    a third elongated member and means for positioning the third elongated member on the first elongated member such that the third elongated member extends upwardly from the plane of the first elongated member and wherein the third elongated member has an extension and means for securing the extension of a like third elongated member.

20. A lawn edging device, comprising:
    a first elongated member having:
        a center portion having an edge;
        a first end portion and a second end portion, each extending from the center portion, the first end portion being attachable to the second end portion of a like device, the second end portion being attachable to the first end portion of a like device, the first and second end portions being sized such that, when attached, the combined thicknesses of the first end portion and the second end portion of the like device are substantially the same as the thickness of the center portion;
    a second elongated member having an edge, the second elongated member being attached to the first elongated member such that the first and second elongated members form a vertex at the attached edges;
    a third elongated member, the third elongated member being positionable on the first elongated member;
    an extension member extending from the third elongated member; and first and second brackets positioned on the third elongated member for closely receiving the extension member of a like device such that the third elongated member is joined to the third elongated member of the like device.

21. The device of claim 20, wherein the extension member is flexible.

22. The device of claim 20, wherein the extension member is offset from the third elongated member such that the extension member is linearly aligned with the-first and second brackets.

23. The device of claim 20, wherein the third elongated member has a forward surface, and wherein the first bracket has a generally planar bottom surface, the bottom surface forming a substantially right angle with the third elongated member forward surface, the third elongated member being positioned upon the first elongated member by nestling the first elongated member within the right angle.

* * * * *